US012725134B2

(12) United States Patent
Gainsley et al.

(10) Patent No.: US 12,725,134 B2
(45) Date of Patent: Sep. 1, 2026

(54) AUTOMATIC STAKING OF CRYPTO TOKENS

(71) Applicant: Coinbase, Inc., Oakland, CA (US)

(72) Inventors: Justin Evan Gainsley, New York City, NY (US); Anna Babayeva, San Francisco, CA (US); Becca Rosen, San Francisco, CA (US); Karthik Ramakrishnan, Vancouver (CA); Jonah Witcig, New York, NY (US)

( * ) Notice: Subject to any disclaimer, the term of this patent is extended or adjusted under 35 U.S.C. 154(b) by 111 days.

(21) Appl. No.: 18/211,157

(22) Filed: Jun. 16, 2023

(65) Prior Publication Data

US 2024/0420099 A1 Dec. 19, 2024

(51) Int. Cl.
*G06Q 20/06* (2012.01)

(52) U.S. Cl.
CPC ....... *G06Q 20/065* (2013.01); *G06Q 2220/00* (2013.01)

(58) Field of Classification Search
CPC .. G06Q 20/065; G06Q 2220/00; G06Q 20/02; G06Q 20/326; G06Q 20/3678
See application file for complete search history.

(56) References Cited

U.S. PATENT DOCUMENTS 11,151,549 B2 * 10/2021 Ehrlich-Quinn ..... G06Q 20/326
12,008,555 B2 * 6/2024 DeRosa-Grund ..... H04L 67/104
2006/0200411 A1 * 9/2006 Morgenstern .......... G06Q 40/06 705/43
2013/0080351 A1 * 3/2013 Schneider .............. G06Q 40/04 705/36 R
2013/0080385 A1 * 3/2013 Ho ........................ G06F 16/273 707/613
2013/0254007 A1 * 9/2013 Cockcroft .............. G06Q 30/02 705/26.1
2014/0236759 A1 * 8/2014 Mirabile ............ G06Q 30/0633 705/26.8
2016/0071210 A1 * 3/2016 Stearns .................. G06Q 40/06 705/36 R
2019/0340946 A1 * 11/2019 Elmessiry ................ G09B 5/12
2020/0334674 A1 * 10/2020 Youngblood .......... G06Q 20/36

(Continued)

OTHER PUBLICATIONS

Figment Insider, Nov. 2022, Figment, https://assets.website-files.com/6255c414fdfc142adad570c2/6363da324f19d8dc2d71f1e5_Figment_Q3%20Report%202022-Final%20(1).pdf, p. 31 (Year: 2022).*

*Primary Examiner* — Yingying Zhou
(74) *Attorney, Agent, or Firm* — Holland & Hart LLP

(57) ABSTRACT

Methods, systems, and devices for data management are described. A custodial token platform may determine whether one or more crypto tokens associated with a user account at the custodial token platform satisfy a criteria. The custodial token platform may display a user interface including an indication that staking is available for a first crypto token based on the first crypto token of the one or more tokens satisfying the criteria. The custodial token platform may receive one or more inputs from a user via the user interface, including an input that indicates an amount of the first crypto token to stake. The custodial token platform may generate messages configured to stake the amount of the first crypto token via a blockchain network associated with the first crypto token. Further, user may opt in to automatically stake future crypto tokens received by the user account and that are eligible for staking.

18 Claims, 10 Drawing Sheets

(56) References Cited

U.S. PATENT DOCUMENTS

| | | | | |
|---|---|---|---|---|
| 2021/0049685 | A1* | 2/2021 | Tachau | G06Q 40/03 |
| 2021/0304191 | A1* | 9/2021 | O'Grady | G06F 9/541 |
| 2021/0398211 | A1* | 12/2021 | Maathur | G06Q 20/401 |
| 2022/0076331 | A1* | 3/2022 | Filter | G06Q 20/3276 |
| 2023/0168944 | A1* | 6/2023 | Karlin | G06N 7/01<br>718/104 |
| 2024/0386489 | A1* | 11/2024 | Eutsler | G06Q 20/3825 |

* cited by examiner

200

600

AUTOMATIC STAKING OF CRYPTO TOKENS

FIELD OF TECHNOLOGY

The present disclosure relates generally to data management, including techniques for automatic staking of crypto tokens.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
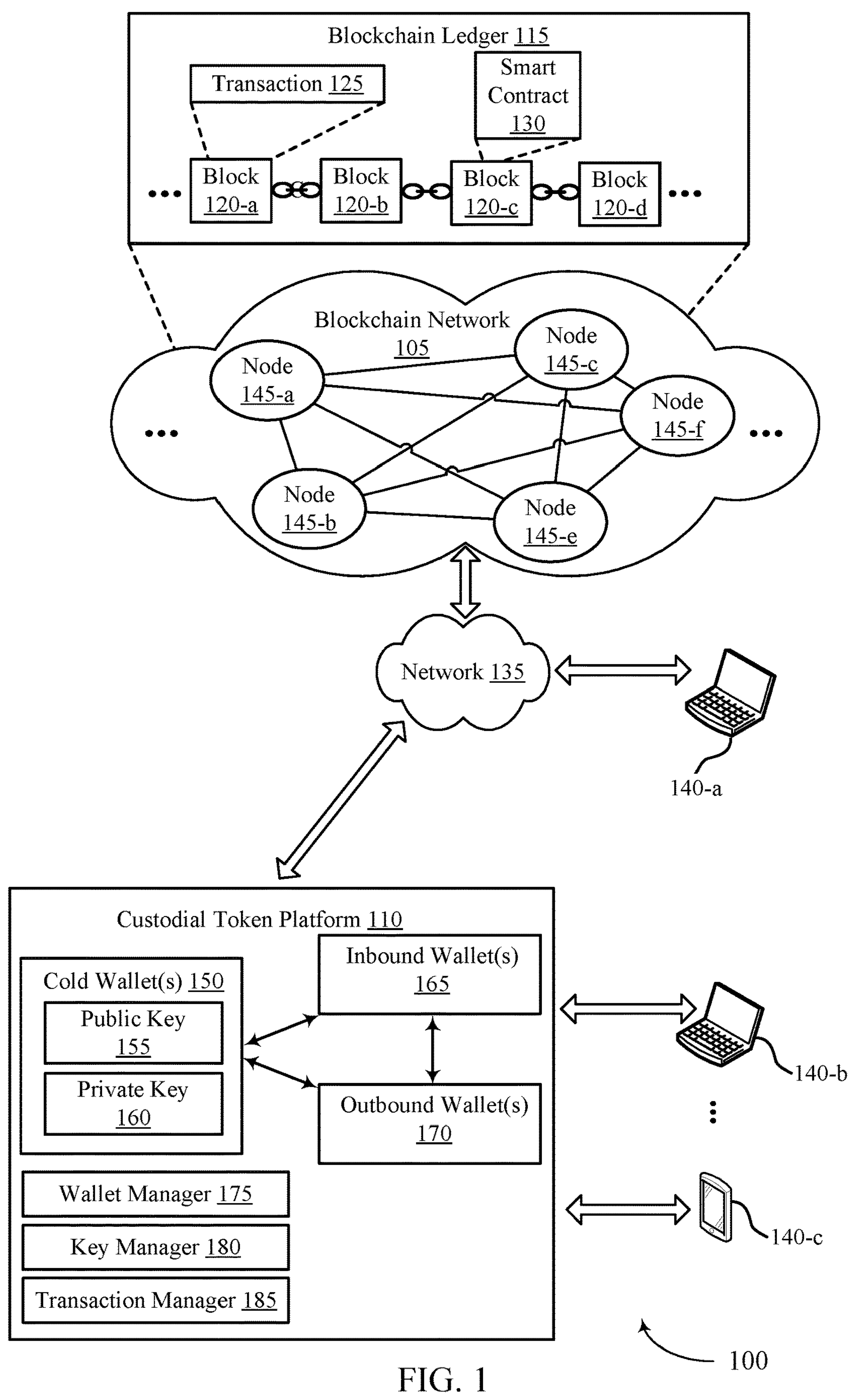
FIG. 1 illustrates an example of a computing environment that supports automatic staking of crypto tokens in accordance with aspects of the present disclosure.

Some cryptocurrencies may be supported by blockchain networks which rely on a proof-of-stake consensus mechanism. A proof-of-stake consensus mechanism may involve users staking an amount of cryptocurrency (e.g., locking, delegating, freezing, or tying up some tokens) to a validation node and validating cryptographic transactions (e.g., attesting to a new block, creating a block, etc.) to earn rewards. For example, the "staked" amount of tokens may represent a personal stake (e.g., responsibility) of a user in maintaining security of the blockchain (e.g., via attesting to a new block, block creation, etc.). In some cases, users may delegate stakes to other users or parties (e.g., via a custodial token platform) who may perform validation on their behalf. Proof-of-stake consensus mechanisms may be associated with reduced energy consumption (e.g., relative to other consensus mechanisms, such as proof-of-work) for validating transactions, securing the network, and issuing new cryptocurrency.

Users may benefit from staking crypto tokens but may experience a barrier to entry. For example, users may not understand staking or potential returns (e.g., rewards) associated with staking, and the process to stake crypto tokens may be time consuming or repetitive. That is, a user may manually elect to stake crypto tokens new to the user account (e.g., recently received via a transaction or purchase of crypto tokens) after the crypto tokens are acquired despite having crypto tokens already staked. To stake crypto tokens, users may select (e.g., manually) crypto tokens to stake (e.g., tokens of a selected cryptocurrency) and an amount of crypto tokens to stake. When a user acquires additional crypto tokens (e.g., crypto tokens of the previously selected cryptocurrency or a different cryptocurrency), the user may, again, select crypto tokens and an amount of the crypto tokens to stake. Additionally, staking may rely on a validation node, and set-up and configuration of such nodes may be complex. Further, validation nodes may utilize significant power and energy resources.

Some parties or services, such as a custodial token platform described herein, may perform staking for users (e.g., as a delegate). As such, users may contribute to the security of the network without having to set up and maintain a validation node. Further, the custodial token platform may, based on one or more inputs from the user, perform staking automatically (e.g., when new crypto tokens are acquired).

For example, if a user is eligible to stake an amount of their crypto tokens, a user interface may display an indication that staking is available. The indication may include an estimate of potential earnings, an amount of eligible crypto tokens, an estimate of missed earnings (e.g., over the past year), or the like. The user may customize the amounts (e.g., set a percentage, quantity, dollar amount, etc. of the crypto token) or stake a default amount. The user may also, while confirming an order to stake the customized amounts or default amount, select an option to automatically stake future crypto tokens or, otherwise, opt out of staking future crypto tokens. For example, the user may acquire an amount of the crypto token, and, based on the selection to automatically stake future crypto tokens, the custodial token platform may automatically stake the acquired amount of the crypto token.

The user interface may display additional indications to the user indicating eligible crypto tokens for staking (e.g., if the user is eligible for staking again, if the user opted out of automatic staking for the crypto token, or if the user acquires an amount of a different crypto token, etc.). Additionally, the user interface may display additional indications to the user to opt out (e.g., when an additional amount of the crypto token is acquired and automatic staking is enabled).

After the user has elected to stake crypto tokens via the user interface, the systems described herein may perform actions to stake the tokens, such as by generating and broadcasting on-chain transactions configured to stake the crypto tokens associated with the user account via a corresponding blockchain network. Techniques described herein may lower the barrier to entry for users who may benefit from potential returns (e.g., rewards) associated with staking.

FIG. 1 illustrates an example of a computing environment 100 that supports automatic staking of crypto tokens in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the custodial token platform 110, the blockchain network 105, or both. For example, a user of the computing device 140-*a* may provide user inputs via the computing device 140-*a*, which may result in commands, data, or any combination thereof being communicated via the network 135 to the custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

As described herein, the custodial token platform 110 may enable a user to stake crypto tokens, automatically stake crypto tokens acquired in the future, or both. For example, if a user is eligible to stake an amount of crypto tokens associated with a user account, a user interface may display an indication that staking is available, including an estimate of potential earnings, an amount of eligible crypto tokens, an estimate of missed earnings, or the like. The user may stake an amount of crypto tokens (e.g., a customized amount or default amount), automatically stake future crypto tokens, or, otherwise, opt out of staking future crypto tokens.

The systems described herein may perform actions according to user selections to stake the crypto tokens, such as by generating and broadcasting on-chain transactions configured to stake the crypto tokens associated with the user account via a corresponding blockchain network. Techniques described herein may lower the barrier to entry for users who may benefit from potential returns (e.g., rewards) associated with staking. Additionally, by performing staking on behalf of users, the complexities associated with building, configuring, and/or maintaining a validation node (e.g., a node 145) may be removed from the users. Additionally, a validation node may be associated with significant processing and other resource (e.g., power) overhead. As such, the custodial token platform 110 may provide the staking service that removes those overheads from the user. As such, users may contribute to the security of the blockchain network 105 and the accuracy of the blockchain ledger 115, via staking, without having to maintain a validation node.

Figure 2:
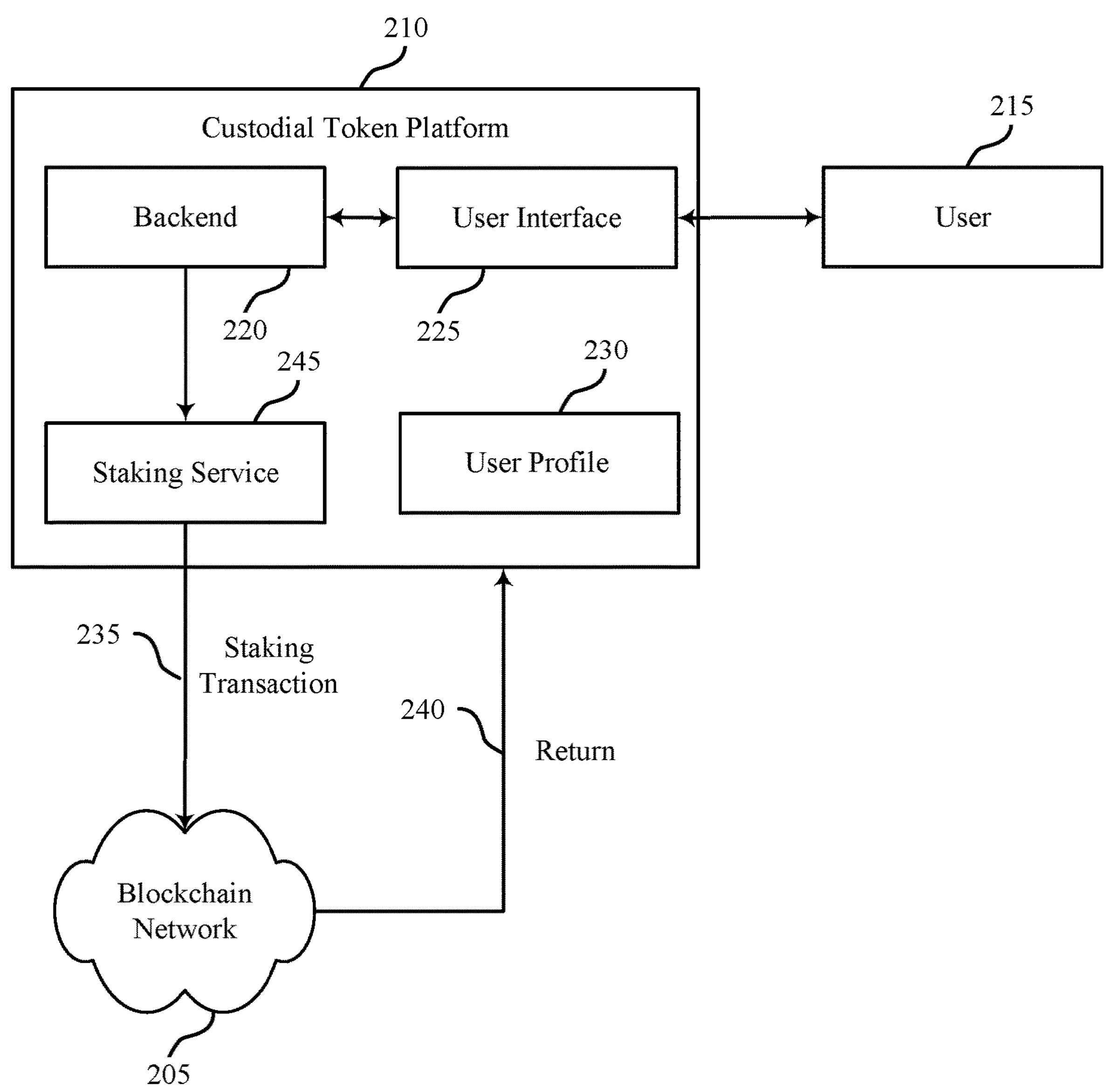
FIG. 2 shows an example of a computing environment that supports automatic staking of crypto tokens in accordance with aspects of the present disclosure.

FIG. 2 shows an example of a computing environment 200 that supports automatic staking of crypto tokens in accordance with aspects of the present disclosure. The computing environment 200 may include a custodial token platform 210 and a blockchain network 205, which may be examples of the custodial token platform 110 and the blockchain network 105 as described with respect to FIG. 1.

As described herein, the blockchain network 205 may use a proof-of-stake consensus mechanism to support validation of transactions and security for the blockchain network 205 while producing a return 240 for a user 215. As such, the custodial token platform 210 may implement techniques to support staking on behalf of the users. That is, the custodial token platform 210 may implement, use, or support a validation node to support staking for user crypto tokens.

For example, the proof-of-stake consensus mechanism may involve a validating process (e.g., an attesting process) in which a quantity of stakers (e.g., validators) may be assigned to a block of a blockchain associated with the blockchain network 205, and a user or staker may lock, delegate, freeze, or otherwise tie up some crypto tokens (e.g., assets) via the staking procedure and a validator node. For example, the validator node may execute the blockchain protocol or program such as to store a copy of a history associated with the blockchain, verify new cryptographic transactions, or both. The user, by staking some crypto tokens, may be included in a group of users (e.g., a committee) who propose a new block of transactions and vote to validate (e.g., attest to) the transactions included in the new block and may be reward with staking returns or rewards based on the transactions attestation. It should be understood that a variety of different staking procedures or mechanisms are contemplated within the scope of the present disclosure.

In some cases, a user 215 may delegate the staked crypto tokens to another user or party who may perform validation on their behalf. For example, as described herein, the user 215 may delegate an amount of crypto tokens to the custodial token platform 210 to stake. The custodial token platform 210, based on one or more inputs from the user 215 via a user interface 225, may generate and broadcast on-chain transactions that are configured to stake the crypto tokens associated with a user profile 230 of the user 215 via the corresponding blockchain network 205.

Techniques described herein may enable the user 215 to easily stake the amount of crypto tokens and earn the return 240. For example, aspects of the custodial token platform 210, such as a backend 220, may determine that the user profile 230 of the user 215 is associated with an amount of crypto tokens eligible for staking. For example, the custodial token platform 210 may determine that at least a portion of crypto tokens (e.g., 15% or more of tokens) associated with the user profile 230 are unstaked. That is, the backend 220 may determine that the user profile 230 is associated with at least a threshold percentage of unstaked crypto tokens such that the user profile 230 satisfies the criteria.

Based on the user profile 230 satisfying the criteria, the user interface 225 may display one or more indications to the user 215. For example, the user interface 225 may display an indication of the amount of eligible crypto tokens for staking, an estimated return (e.g., a return amount or rate of return), an estimate of missed earnings (e.g., due to unstaked tokens), or the like. Further, the user interface 225 may display an indication of an option to stake eligible crypto tokens (e.g., all eligible tokens).

If a user opts in to stake eligible crypto tokens via the user interface 225, the user interface 225 may display an option to stake all eligible crypto tokens (e.g., a default option) or customize an amount (e.g., an amount of crypto tokens, a percentage, a dollar amount, etc.) of one or more of the eligible crypto tokens to stake. For example, the user 215 may select the default option and stake all eligible crypto tokens, or, otherwise, select the option to customize the amount for each eligible token.

Based on the selection of the user 215, the user interface 225 may display a list of current crypto tokens associated with the user profile 230 of the user 215 as well as options to customize an amount of each crypto token to stake. For example, based on the user 215 selecting the option to customize, the user interface 225 may prompt the user 215 to input a customized amount of crypto tokens to stake. The user 215 may input an amount of crypto tokens, a percentage, a dollar amount, or the like to stake. Further, the user 215 may stake different amounts of different crypto tokens. That is, the user 215 may select to stake a first amount of a first crypto token, a second amount of a second crypto token, and so on.

Additionally, or alternatively, based on the selection of the user 215, the user interface 225 may display an order summary. For example, the user interface 225 may display an order summary based on the user 215 selecting the default option to stake all eligible crypto tokens or based on the user 215 indicating a customized amount of crypto tokens to stake. Further, the user interface 225 may display an option to stake future crypto tokens. For example, the user 215 may either opt in or opt out of staking tokens that are acquired, for example, after the amount of crypto tokens in the current order are staked.

After the user 215 submits the staking order, the backend 220 may initiate a staking transaction 235. For example, the backend 220 may generate one or more messages that are configured to stake the selected amount of the crypto token via the blockchain network 205. The one or more messages may include a request to an asynchronous queue (e.g., a request to validate or process the staking transaction 235). In some examples, the backend 220 may generate the one or more messages for each crypto token selected to be staked. For example, the user 215 may select to stake a quantity of crypto tokens (e.g., a first crypto token, a second crypto token, etc.), and the backend 220 may generate a message (e.g., a separate message including a request) for each crypto token accordingly, such that each message is formatted for the corresponding blockchain network. In some examples, the custodial token platform 210 may aggregate the amount of the crypto token to be staked and generate a message (e.g., a single message) to stake the amount of the crypto token.

In some examples, the custodial token platform 210 may maintain or utilize a separate service (e.g., the staking service 245) that maintains a validation node or performs operations for staking via a blockchain network or smart contract. That is, the staking service 245 may be configured to interact with the blockchain network 205. In such cases, after the user submits a staking order, the backend 220 may generate and transmit the messages described herein via an application programming interface (API) request to the staking service 245. The staking service 245 may then perform operations to cause the respective assets to be staked via the blockchain network, such as by broadcasting one or more staking transactions 235. As described herein, the API request transmitted to the blockchain network may include indications of multiple different crypto tokens for multiple different blockchain networks, and the staking service 245 may handle generating separate staking transactions/messages that are broadcast to perform the staking. As such, the custodial token platform 210 effectively performs staking at a "portfolio level" rather than a "asset level," which improves user experience as well as computing efficiency (e.g., by reducing the quantity of API requests).

The request or the API requests to the staking service 245 may be processed in the asynchronous queue. After the request is processed, the staking transaction may be broadcast via the blockchain network such that the staking transaction 235 may be added to the blockchain ledger as one or more ledger entries. For example, the amount of crypto tokens selected by the user 215 to stake may be included in the blockchain ledger as ledger entries identifying the amount of crypto tokens as staked.

Figure 3:
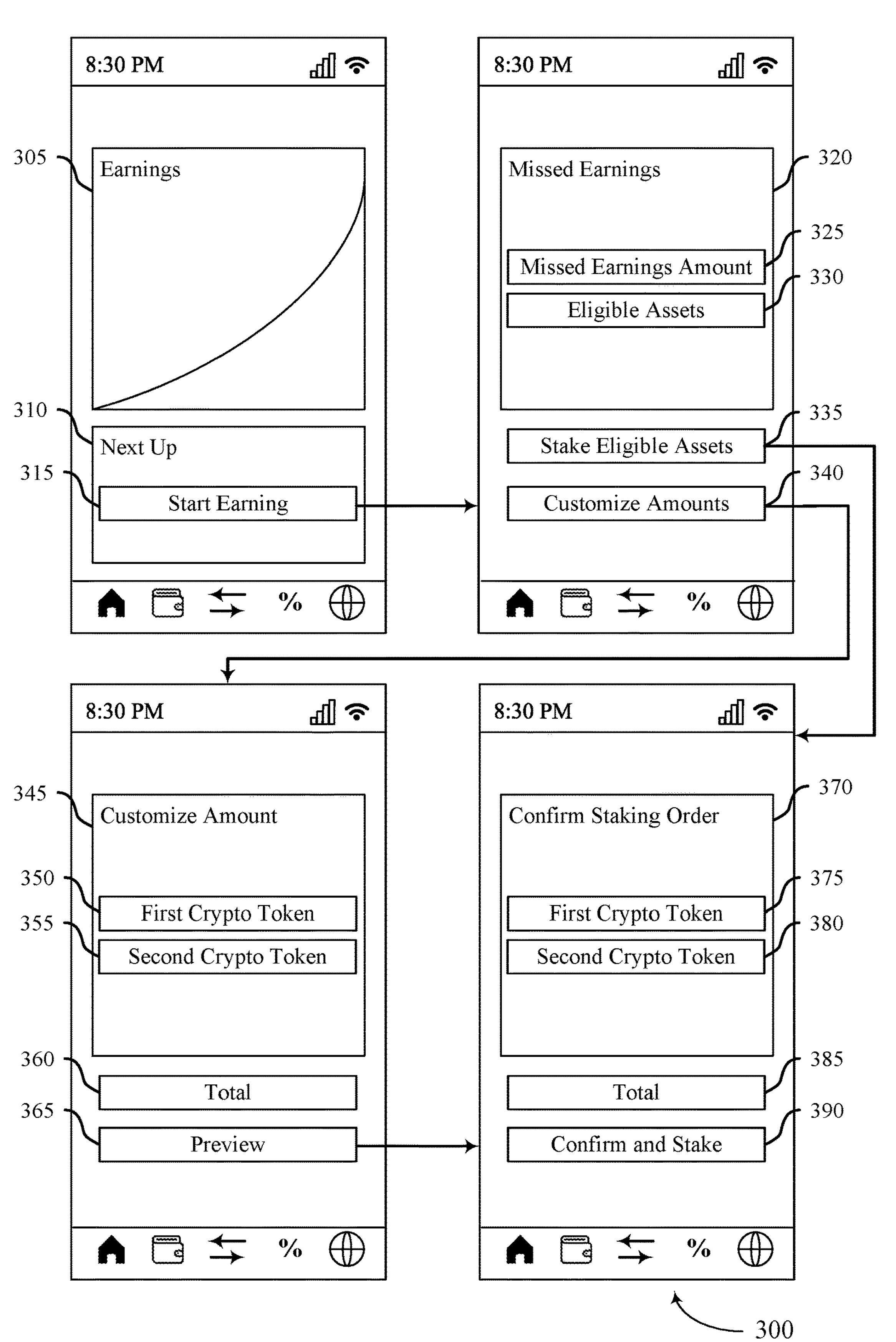
FIG. 3 shows an example of a user interface diagram that supports automatic staking of crypto tokens in accordance with aspects of the present disclosure.

FIG. 3 shows an example of a user interface diagram 300 that supports automatic staking of crypto tokens in accordance with aspects of the present disclosure. The user interface diagram 300 be implemented by a custodial token platform 110 via a user device 140, which may be examples of corresponding devices or systems as described with respect to FIGS. 1 and 2.

A user interface of the user interface diagram 300 may display one or more indications, receive one or more inputs, or both to support automatic staking as described herein. The user interface diagram 300 includes an example of a user interface flow wherein a user may select one or more options associated with staking eligible crypto tokens based on one or more indications. While not explicitly shown in the user interface diagram 300, the user may select to exit the user interface flow at any point. For example, the user may exit the user interface flow and thereby elect to not stake any eligible crypto tokens at any point at least before a final confirm and stake option 390 is selected. That is, no staking order may be placed along the flow until the confirm and stake option 390 is selected.

The user may enter the user interface flow wherein the user may select assets to stake, elect to automatically stake future assets, or both, via an indication of earnings 305. For example, the user may receive, via the user interface, the indication of earnings 305 associated with a user account. The indication of earnings 305 may be included in an earnings tab where one or more other indications, options, or both are also included.

For example, the user interface may, a custodial token platform determining a user meets a criteria, display a next up indication 310 including a start earning option 315 in the earnings tab. That is, the custodial token platform may determine that a user profile is associated with at least a threshold percentage of an amount of an unstaked crypto token (e.g., 15% of eligible tokens associated with the user account are unstaked) such that the user is eligible to stake at least a portion of tokens associated with the user account and, accordingly. display the start earning option 315 in the next up indication 310 via the user interface.

In some examples, the user may select the start earning option 315. In such cases, the user interface may display an indication of missed earnings 320 (e.g., including a missed earnings amount 325, an indication of eligible assets 330, or both), an option to stake eligible assets 335, and an option to customize amounts 340. The user may select the option to stake eligible assets 335 or the option to customize amounts 340 based on the indication of missed earnings 320. In some examples, the indication of the missed earnings may be displayed in the next up indication 310 such as to cause the user to enter the user interface flow as described herein.

The missed earnings 320 may be indicated based on the custodial token platform determining a return associated with an amount of eligible crypto tokens eligible for staking during a prior time period. For example, the user account may have been associated with a first amount of a first crypto token eligible for staking during a first time period. The backend may determine a first return associated with the first amount of the first crypto token during the first time period and indicate the first return to the user via the missed earnings amount 325. In some examples, the missed earnings amount 325 may be a rate of return, a dollar amount, an amount of a crypto token, or a combination thereof. Further, the user interface may include an additional missed earnings amount 325 based on the user account being associated with additional eligible crypto tokens for staking. For example, the user interface may include a second missed earnings amount for a second crypto token eligible for staking. In some examples, the time period is one year, and as such, the missed earning may show the amount the user would have earned if the user had staked eligible tokens for the prior year. Other time periods are contemplated within the scope of the present disclosure.

Further, the missed earnings 320 may include an indication of the eligible assets 330. That is, the user interface may display the indication of the eligible assets 330 based on the custodial token platform determining one or more crypto tokens associated with the user account are eligible for staking. The eligible assets 330 may include one or more amounts of one or more eligible crypto tokens (e.g., the first crypto token, the second crypto token, or both) for staking.

In some examples, the user may select the option to customize amounts 340. For example, the user may, based on the indication of missed earnings 320, move forward with staking an amount of the eligible crypto tokens but may not stake all eligible crypto tokens.

If the user selects the option to customize amounts 340, the user interface may display an indication to customize amounts 345 including an option to input an amount of a first crypto token 350 and an option to input an amount of a second crypto token 355. In some examples, the user interface may display additional options to input amounts of additional crypto tokens (e.g., in addition to the first crypto token and the second crypto token) based on the user account being associated with additional crypto tokens eligible for staking.

In some examples, the option to input the amount of the first crypto token 350, the option to input the amount of the second crypto token 355, or both, may include one or more suggested amounts. For example, the options to input the respective amounts may be autofilled with respective suggested amounts corresponding to an amount of each crypto token staked by one or more other users. For example, the suggested amounts may indicate average staking amount/percentage performed by other users of the custodial token platform.

In some examples, the user may input the amount of the first crypto token 350, the amount of the second crypto token 355, or both as a percentage, a dollar amount, or an amount of the crypto token. In some cases, the user interface displays as many eligible tokens as the user holds (e.g., tokens associated with the user account). If the user only has one eligible, >15% unstaked asset, they will only see one. If the user has five eligible, >15% unstaked assets, they will see all five. Thus, the user may input amounts for each eligible crypto token. For example, the user may input a percentage of a crypto token to stake relative to the amount (e.g., the total amount) of the crypto token associated with the user account. In some examples, the percentage is selected from a set of predefined buttons or UI components (e.g., buttons that indicate 25%, 50%, 75%, and 100%). Additionally, or alternatively, the user may input a dollar amount of a crypto token corresponding to an amount of the token to be staked. Further, the user may input a quantity (e.g., amount) of the token. The user may input an amount equal to or less than the total amount of the crypto tokens eligible for staking associated with the user account. That is, the user may elect to stake all eligible crypto tokens, but may not stake an amount of crypto tokens exceeding the amount of eligible crypto tokens associated with the user account. For example, the user may not stake crypto tokens which are already staked or an amount of crypto tokens not associated with the user account.

The user interface, according to the input of the amount of the first crypto token 350 and the amount of the second crypto token 355, may display a total 360. For example, the user interface may display a total amount of tokens (e.g., assets) to be staked. Additionally, the user interface may display an option to preview 365. For example, the user interface may display an option to select to preview 365 the order based on the customized amounts of the first crypto token 350, the second crypto token 355, or both.

The user interface may display an indication of a confirmation of a staking order 370 (e.g., including an amount of the first crypto token 375, an amount of the second crypto token 380, and/or an amount of other crypto tokens that the user decided to stake via the user interface), a total 385, and an confirm and stake option 390 based on the user selecting an option to preview 365 the customized amounts or the user selecting to stake eligible assets 335.

The confirmation of the staking order 370 may include an amount of the first crypto token 375, an amount of the second crypto token 380, or both. For example, the amount of the first crypto token 375 and the amount of the second crypto token 380 may correspond to the suggested amounts to stake (e.g., if the user opted to stake eligible assets 335 or, otherwise, selected to customize amounts 340 but did not change the suggested amounts) or to the customized amounts (e.g., if the user opted to customize amounts 340 and edited the suggested amounts). Further, the total 385 may indicate the total amount of assets elected by the user to stake. The total 385 may correspond to the sum of the amount of the first crypto token 375 and the amount of the second crypto token 380.

In some examples, the confirmation of the staking order 370 may include an option to automatically stake future assets. For example, the user interface may display an option to opt in to staking crypto tokens associated with the user account in the future. That is, if the user elects to opt in to automatically staking future assets, the backend of the custodial token platform may automatically generate one or more messages configured to stake an amount of eligible new tokens associated with the user account via one or more blockchain networks associated with the new tokens. For example, the backend may automatically begin staking assets added to the user account (e.g., transferred to the user account via a transaction, purchased by the user account via the custodial token platform, etc.).

The user interface may also display a confirm and stake option 390. The user may select the option to confirm the order and initiate staking of the selected crypto tokens. For example, selecting the confirm and stake option 390 may cause the backend of the custodial token platform to generate one or more messages configured to stake the amounts of the selected tokens via respective blockchain networks associated with each crypto token. For example, the backend may generate one or more first messages to stake the amount of the first crypto token 375 via a first blockchain network associated with the first crypto token and one or more second messages to stake the amount of the second crypto token 380 via a second blockchain network associated with the second crypto token.

In some examples, the user interface may indicate an option to opt out of automatic staking. For example, the user may purchase one or more crypto tokens which were previously elected to automatically stake. During purchase of these one or more crypto tokens, the backend may determine that the user intends to purchase the one or more crypto tokens which are set to be automatically staked and, via the user interface, indicate an option to opt out of automatic staking.

The user interface may indicate options for the user to enter the user interface flow in the future and stake additional assets, stake future assets, or both. For example, the user may acquire an amount of a third crypto token, and the backend may determine the amount of the third crypto token is eligible for staking. Based on the eligibility of the third crypto token for staking, the user interface may display the start earning option 315 (e.g., at a time different than previously described) such that the user may enter the user interface flow and elect to stake the eligible amount of the third crypto token, automatically stake future amounts of the third crypto token, or both.

Figure 4:
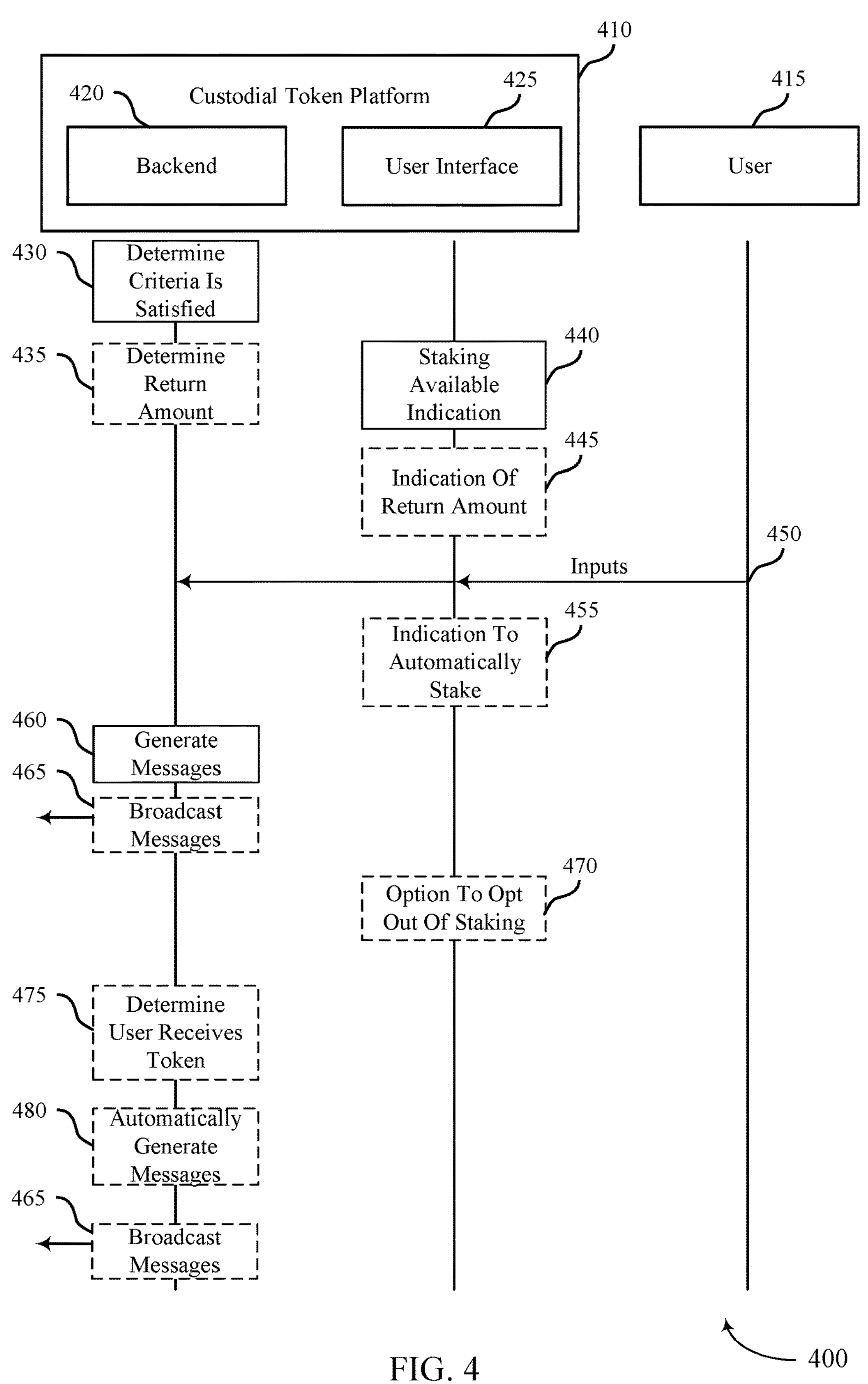
FIG. 4 shows an example of a process flow that supports automatic staking of crypto tokens in accordance with aspects of the present disclosure.

FIG. 4 shows an example of a process flow 400 that supports automatic staking of crypto tokens in accordance with aspects of the present disclosure. The process flow 400 may include a custodial token platform 410 including a backend 420 and a user interface 425 as well as a user 415. The custodial token platform 410 may be an example of the custodial token platforms as described with respect to FIG. 1 and FIG. 2. The user 415, backend 420, and user interface 425 may be examples of the user, backend, and user interface as described with respect to FIG. 2.

In the following description of the process flow 400, the operations between the user 415, user interface 425, and backend 420 may be transmitted in a different order than the example order shown, or the operations performed may be performed in different orders or at different times. Some operations may also be omitted from the process flow 400, and other operations may be added to the process flow 400.

At 430, the backend 420 of the custodial token platform 410 may determine a criteria is satisfied. For example, the backend 420 may determine whether one or more crypto tokens associated with a user account associated with the user 415 satisfy the criteria. In some examples, the criteria may be a threshold percentage of a first crypto token of the one or more crypto tokens associated with the user account of the user 415 that are eligible for staking. For example, the user 415 may meet the criteria based on the user account of the user 415 having a percentage (e.g., at least more than 15%) of the first crypto token (e.g., an asset) unstaked or a percentage of eligible crypto (e.g., that are associated with the user account) unstaked. In some examples, the backend 420 may determine that staking is available for the first crypto token and one or more other crypto tokens, such as a second crypto token. In some examples, the backend 420 executes a periodic process or job that processes user accounts to identify whether the user accounts satisfy the criteria.

At 435, the backend 420 may determine a return amount. For example, the backend 420 may estimate a potential return (e.g., reward) amount based on the user account of the user 415 satisfying the criteria at 430. In some examples, the estimated potential return may correspond to a dollar amount, a rate of return, an amount of the first crypto token, or the like. Further, the estimated potential return may be determined based on the eligible (e.g., unstaked) amount of the first crypto token associated with the user account. That is, the backend 420 may determine (e.g., calculate) the estimated potential return according to the unstaked amount of the first crypto token (e.g., assets) associated with the user account of the user 415 as well as the return or reward rate associated with the corresponding blockchain network and/or the return or reward rate provided by the custodial token platform 410. In some examples, the backend 420 may determine one or more additional estimated potential returns based on staking being available for the first crypto token and the one or more other crypto tokens (e.g., the second crypto token). Additionally, or alternatively, the return amount may include a return amount that the user account would have received via staking the first crypto token and the one or more other crypto tokens (e.g., the crypto tokens eligible for staking) for a prior time period. That is, the return amount may be a missed return.

At 440, the user interface 425 of the custodial token platform 410 may display a staking available indication. For example, the custodial token platform 410, via the user interface 425, may display an indication that staking is available for the first crypto token based on the first crypto token satisfying the criteria. In some examples, the user interface 425 may indicate that staking is available for the one or more other crypto tokens, such as the second crypto token, in addition to the first crypto token based on the on the one or more other crypto tokens satisfying the criteria or a portion of the tokens associated with the user account satisfying the criteria.

At 445, the user interface 425 may display an indication of a return amount. For example, the user interface 425 may display the indication of the return amount determined at 435 by the backend 420. The indication of the return amount may indicate the dollar amount, the rate of return, the amount of the first crypto token, or the like determined (e.g., calculated) by the backend according to the unstaked amount of the first crypto token. In some examples, the indication of the return amount may include one or more return amounts based on the one or more other crypto tokens satisfying the criteria. For example, the indication of the return amount may include a first return amount corresponding to the first crypto token, a second return amount corresponding to a second crypto token, and so on. Additionally, or alternatively, the return amount may include the missed return corresponding to the return amount the user account would have received via staking the crypto tokens eligible for staking for the prior time period.

At 450, the user 415, via the user interface 425, may transmit one or more inputs. For example, the backend 420 may receive the one or more inputs from the user 415 via the user interface 425. The one or more inputs may include an input that indicates an amount of the first crypto token to stake. For example, the input may include a selection of the first crypto token, where the first crypto token and the one or more other crypto tokens are eligible for staking. In some examples, the input that indicates the amount of the first crypto token to stake may be a percentage (e.g., a percentage of the first crypto token relative to a total amount of the first crypto token associated with the user account of the user 415), a quantity of the first crypto token, or a dollar amount of the first crypto token.

In some examples, the one or more inputs may include an input that indicates a default amount of the first crypto token, the second crypto token, or both to stake. For example, the backend 420 may determine, and the user interface 425 may display, an option (e.g., a default option) to stake the eligible crypto tokens. The option may be based on an amount of each crypto token of the eligible crypto tokens staked by one or more other users. For example, the option may include a first amount (e.g., percentage) of the first crypto token, a second amount of the second crypto token, and so on.

In some examples, the one or more inputs may include an input that indicates a customized amount of the first crypto token, the second crypto token, or both to stake. For example, the user interface 425 may display an option to customize the amount of eligible crypto tokens to stake. The option to customize may include a percentage, a quantity, or a dollar amount of each eligible crypto token. For example, the user 415 may input, via the user interface 425 and the option to customize, a first amount of the first crypto token and a second amount of the second crypto token to stake.

At 455, the user interface 425 may display an indication to automatically stake. For example, the user interface 425 may display an indication of an option to automatically stake future crypto tokens received by the user account of the user 415 and that are eligible for staking. The option to automatically stake future tokens may correspond to the tokens being staked by the user 415 according to the one or more inputs at 450. For example, the user 415 may indicate the amount of the first crypto token to stake such that the option to automatically stake future tokens corresponds to the first crypto token. The user 415 may indicate to automatically stake future crypto tokens or to not automatically stake future crypto tokens.

At 460, the backend 420 may generate messages. For example, the backend 420 of the custodial token platform 410 may generate one or more first messages that are configured to stake the amount of the first crypto token via a blockchain network associated with the first crypto token. The backend 420 may generate the one or more first messages based on the input at 450 indicating the amount of the first crypto token to stake. The one or more first messages may initiate a staking transaction. For example, the one or more first messages may include a request to an asynchronous queue to validate (e.g., process) the staking transaction. Additionally, or alternatively, the backend 420 or another service or system of the custodial token platform 410 may generate one or more API messages that are configured to be transmitted to a staking service of the custodial token platform 410 via API requests. Further, the staking transaction may be added to a blockchain ledger of the blockchain as one or more ledger entries indicating the amount of the first crypto token as staked.

At 465, the backend 420, the staking service, or another component or system of the custodial token platform 410 may broadcast one or more messages via the blockchain network such as to cause the crypto tokens to be staked via the blockchain network. For example, the staking service may broadcast the messages (e.g., transactions) in response to the API requests from the backend.

At 470, the user interface 425 may display an option to opt out of staking. For example, the backend 420 of the custodial token platform 410 may determine that the user 415 intends to acquire the second crypto token via the custodial token platform 410. The user 415 may have previously (e.g., via the one or more inputs at 450) indicated to opt in to automatically staking future crypto tokens received by the user account and that are eligible for staking. In such cases, the backend 420 may determine that the user 415 intends to acquire the second crypto token (e.g., purchase the second crypto token on the custodial token platform 410) and display, via the user interface 425, an option to opt out of staking the second crypto token. The user may navigate to a page including an option to purchase a crypto token and the opt option may be displayed accordingly. Thus, if the user does not indicate or select the opt out option, the backend 420 may automatically generate one or more messages configured to stake the amount of the second crypto token based on the user 415 selecting to automatically stake future crypto tokens and the user acquiring (e.g., purchasing) additional or new crypto tokens.

At 475, the backend 420 may determine the user account of the user 415 received an amount of a crypto token. In some examples, the user account may receive an amount of the first crypto token, one or more other amounts of the other crypto tokens, or both. For example, the user account may receive a second amount of the first crypto token via the custodial token platform 410 (e.g., purchased the second amount on the custodial token platform 410) or via an inbound transfer from another address (e.g., via a transaction transmitted via the corresponding blockchain network).

At 480, the backend 420 may automatically generate one or more additional messages. For example, the backend 420 may generate one or more additional messages based on the user 415 indicating (e.g., via the inputs at 450) to stake the first amount of the first crypto token and a second amount of the second crypto token. For example, the backend 420 of the custodial token platform 410 may generate one or more second messages that are configured to stake the amount of the second crypto token via a blockchain network associated with the second crypto token.

Additionally, or alternatively, the backend 420 may generate the one or more additional messages based on the user 415 opting in to automatically stake future crypto tokens (e.g., while staking, for example, the first amount of the first crypto token) and the user account receiving crypto tokens eligible for staking. For example, the user account may receive (e.g., via a purchase or transaction) an additional amount (e.g., the second amount) of the first crypto token, and the backend 420 may automatically generate the one or more second messages that are configured to stake the second amount of the first crypto token via the blockchain network associated with the first crypto token.

At 465, the backend 420, the staking service, or another component or system of the custodial token platform 410 may broadcast the one or more additional messages via the blockchain network such as to cause the crypto tokens to be staked via the blockchain network. For example, the staking service may broadcast the messages (e.g., transactions) in response to API requests transmitted from the backend.

Figure 5:
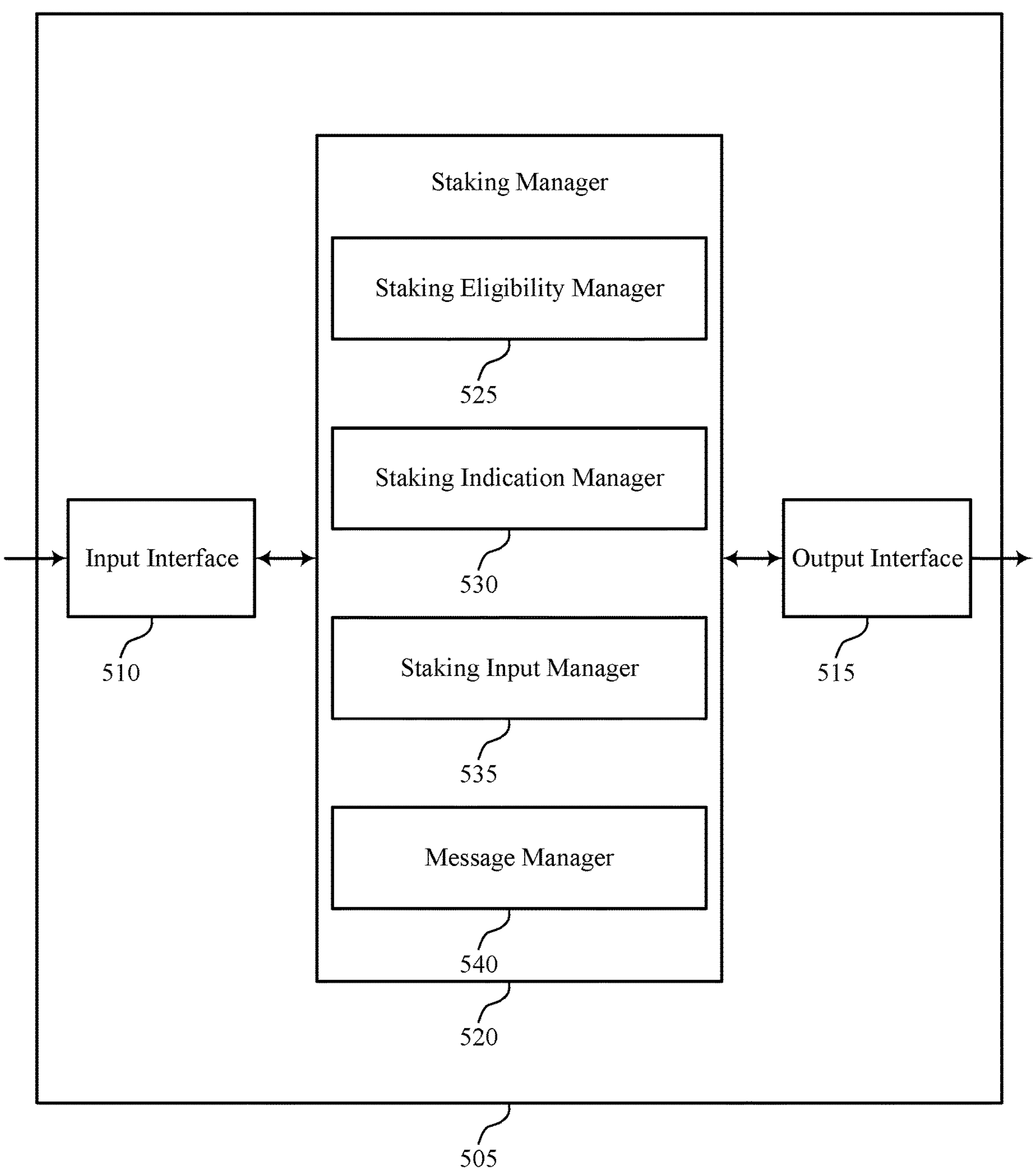
FIG. 5 shows a block diagram of an apparatus that supports automatic staking of crypto tokens in accordance with aspects of the present disclosure.

FIG. 5 shows a block diagram 500 of a system 505 that supports automatic staking of crypto tokens in accordance with aspects of the present disclosure. The system 505 may include an input interface 510, an output interface 515, and a staking manager 520. The system 505, or one or more components of the system 505 (e.g., the input interface 510, the output interface 515, and the staking manager 520), may include at least one processor, which may be coupled with at least one memory, to support the described techniques. Each of these components may communicate, directly or indirectly, with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, transactions, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the staking manager 520 to support automatic staking of crypto tokens. In some cases, the input interface 510 may be a component of a network interface 725 as described with reference to FIG. 7.

The output interface 515 may manage output signaling for the system 505. For example, the output interface 515 may receive signaling from other components of the system 505, such as the staking manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the staking manager 520 may include a staking eligibility manager 525, a staking indication manager 530, a staking input manager 535, a message manager 540, or any combination thereof. In some examples, the staking manager 520, or various components thereof, may be configured to perform various operations (e.g., receiving, monitoring, transmitting) using or otherwise in cooperation with the input interface 510, the output interface 515, or both. For example, the staking manager 520 may receive information from the input interface 510, send information to the output interface 515, or be integrated in combination with the input interface 510, the output interface 515, or both to receive information, transmit information, or perform various other operations as described herein.

The staking manager 520 may support token management in accordance with examples as disclosed herein. The staking eligibility manager 525 may be configured as or otherwise support a means for determining whether one or more crypto tokens associated with a user account at a custodial token platform satisfy a criteria. The staking indication manager 530 may be configured as or otherwise support a means for displaying, based at least in part on a first crypto token of the one or more crypto tokens satisfying the criteria, a user interface comprising an indication that staking is available for the first crypto token. The staking input manager 535 may be configured as or otherwise support a means for receiving, via the user interface, one or more inputs, including an input that indicates an amount of the first crypto token to stake. The message manager 540 may be configured as or otherwise support a means for generating one or more first messages that are configured to stake the amount of the first crypto token via a blockchain network associated with the first crypto token.

Figure 6:
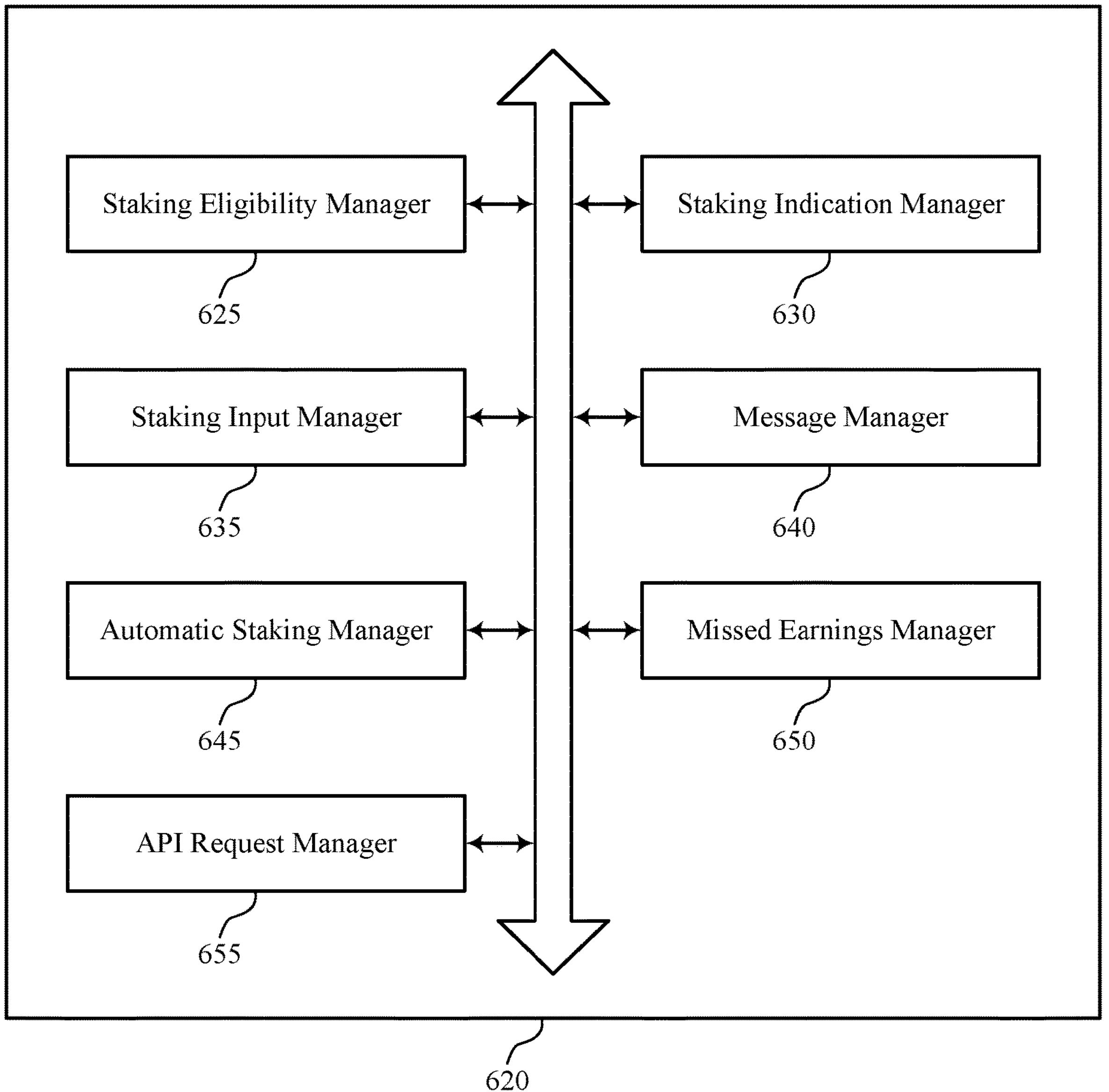
FIG. 6 shows a block diagram of a custodial token platform that supports automatic staking of crypto tokens in accordance with aspects of the present disclosure.

FIG. 6 shows a block diagram 600 of a staking manager 620 that supports automatic staking of crypto tokens in accordance with aspects of the present disclosure. The staking manager 620 may be an example of aspects of a custodial token platform, a staking manager 520, or the system 505, as described herein. The staking manager 620, or various components thereof, may be an example of means for performing various aspects of automatic staking of crypto tokens as described herein. For example, the staking manager 620 may include a staking eligibility manager 625, a staking indication manager 630, a staking input manager 635, a message manager 640, an automatic staking manager 645, a missed earnings manager 650, an API request manager 655, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The staking manager 620 may support token management in accordance with examples as disclosed herein. The staking eligibility manager 625 may be configured as or otherwise support a means for determining whether one or more crypto tokens associated with a user account at a custodial token platform satisfy a criteria. The staking indication manager 630 may be configured as or otherwise support a means for displaying, based at least in part on a first crypto token of the one or more crypto tokens satisfying the criteria, a user interface comprising an indication that staking is available for the first crypto token. The staking input manager 635 may be configured as or otherwise support a means for receiving, via the user interface, one or more inputs, including an input that indicates an amount of the first crypto token to stake. The message manager 640 may be configured as or otherwise support a means for generating one or more first messages that are configured to stake the amount of the first crypto token via a blockchain network associated with the first crypto token.

In some examples, the staking eligibility manager 625 may be configured as or otherwise support a means for determining that the user account received a second amount of the first crypto token. In some examples, the message manager 640 may be configured as or otherwise support a means for automatically generating, based at least in part on determining that the user account received the second amount of the first crypto token, one or more second messages that are configured to stake the second amount of the first crypto token via the blockchain network associated with the first crypto token.

In some examples, the user account received the second amount via the custodial token platform or via an inbound transfer from another address.

In some examples, the automatic staking manager 645 may be configured as or otherwise support a means for displaying, via the user interface, an indication of an option to automatically stake future crypto tokens received by the user account and that are eligible for staking.

In some examples, the criteria is a threshold percentage of a crypto token associated with the user account that are eligible for staking.

In some examples, to support receiving the one or more inputs, the staking input manager 635 may be configured as or otherwise support a means for receiving a selection of the first crypto token of a plurality of crypto tokens that are eligible for taking.

In some examples, to support receiving the one or more inputs, the staking input manager 635 may be configured as or otherwise support a means for receiving an indication of the amount of the first crypto token to stake via the blockchain network, wherein the amount is a percentage of the first crypto token relative to a total amount of the first crypto token associated with the user account, a quantity of the first crypto token, or a dollar amount of the first crypto token.

In some examples, the missed earnings manager 650 may be configured as or otherwise support a means for determining, based at least in part on a first crypto token of the one or more crypto tokens satisfying the criteria, a return amount of at least the first crypto token that the user account would have received via staking the first crypto token for a prior time period. In some examples, the staking indication manager 630 may be configured as or otherwise support a means for displaying, via the user interface, an indication of the return amount.

In some examples, the staking eligibility manager 625 may be configured as or otherwise support a means for determining that the user account intends to acquire a second crypto token via the custodial token platform. In some examples, the staking indication manager 630 may be configured as or otherwise support a means for displaying, via the user interface and after determining that the user account intends to acquire the second crypto token, an option to opt out of staking the second crypto token.

In some examples, the option is displayed based at least in part on receiving the one or more inputs.

In some examples, the API request manager 655 may be configured as or otherwise support a means for transmitting an application programming interface (API) request that is configured to cause the one or more first messages to be broadcast via the blockchain network.

Figure 7:
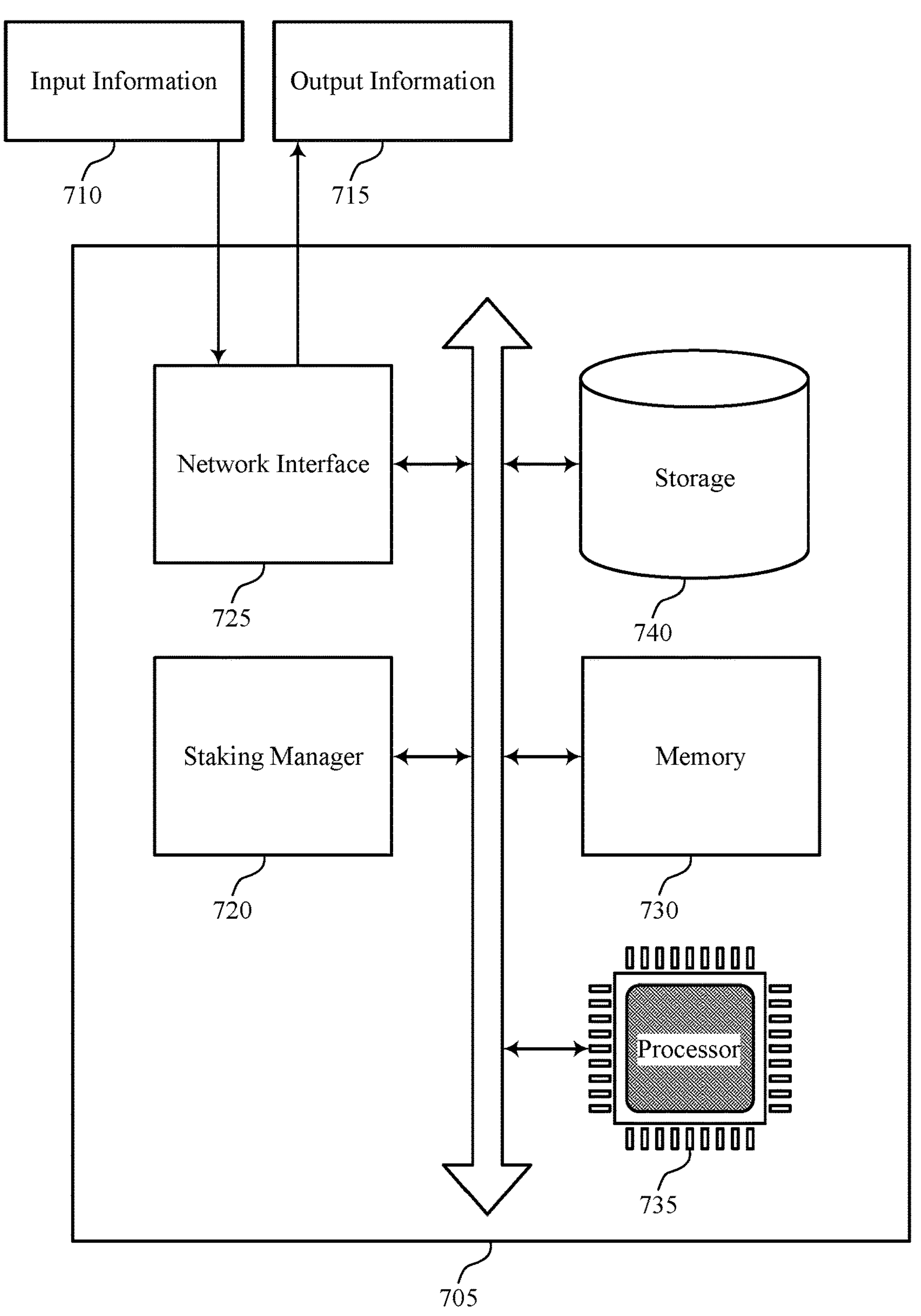
FIG. 7 shows a diagram of a system including a device that supports automatic staking of crypto tokens in accordance with aspects of the present disclosure.

FIG. 7 shows a diagram 700 of a system 705 that supports automatic staking of crypto tokens in accordance with aspects of the present disclosure. The system 705 may be an example of or include the components of a system 505 as described herein. The system 705 may include components for transaction management, blockchain communication, and the like, such as a staking manager 720, an input information 710, an output information 715, a network interface 725, at least one memory 730, at least one processor 735, and a storage 740. Each of these components may communicate, directly or indirectly, with one another (e.g., via one or more buses, communications links, communications interfaces, or any combination thereof).

The network interface 725 may enable the system 705 to exchange information (e.g., input information 710, output information 715, or both) with other systems or devices (not shown). For example, the network interface 725 may enable the system 705 to connect to a network (e.g., a network 135 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause the processor 735 to perform various functions described herein, such as functions supporting automatic staking of crypto tokens. In some cases, the memory 730 may contain, among other things, a basic input/output system (BIOS), which may control basic hardware or software operation such as the interaction with peripheral components or devices. In some cases, the memory 730 may be an example of aspects of one or more components of a custodial token platform 110 as described with reference to FIG. 1.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting automatic staking of crypto tokens). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1.

The staking manager 720 may support token management in accordance with examples as disclosed herein. For example, the staking manager 720 may be configured as or otherwise support a means for determining whether one or more crypto tokens associated with a user account at a custodial token platform satisfy a criteria. The staking manager 720 may be configured as or otherwise support a means for displaying, based at least in part on a first crypto token of the one or more crypto tokens satisfying the criteria, a user interface comprising an indication that staking is available for the first crypto token. The staking manager 720 may be configured as or otherwise support a means for receiving, via the user interface, one or more inputs, including an input that indicates an amount of the first crypto token to stake. The staking manager 720 may be configured as or otherwise support a means for generating one or more first messages that are configured to stake the amount of the first crypto token via a blockchain network associated with the first crypto token.

By including or configuring the staking manager 720 in accordance with examples as described herein, the system 705 may support techniques for improved user experience related to processing and improved coordination between devices.

Figure 8:
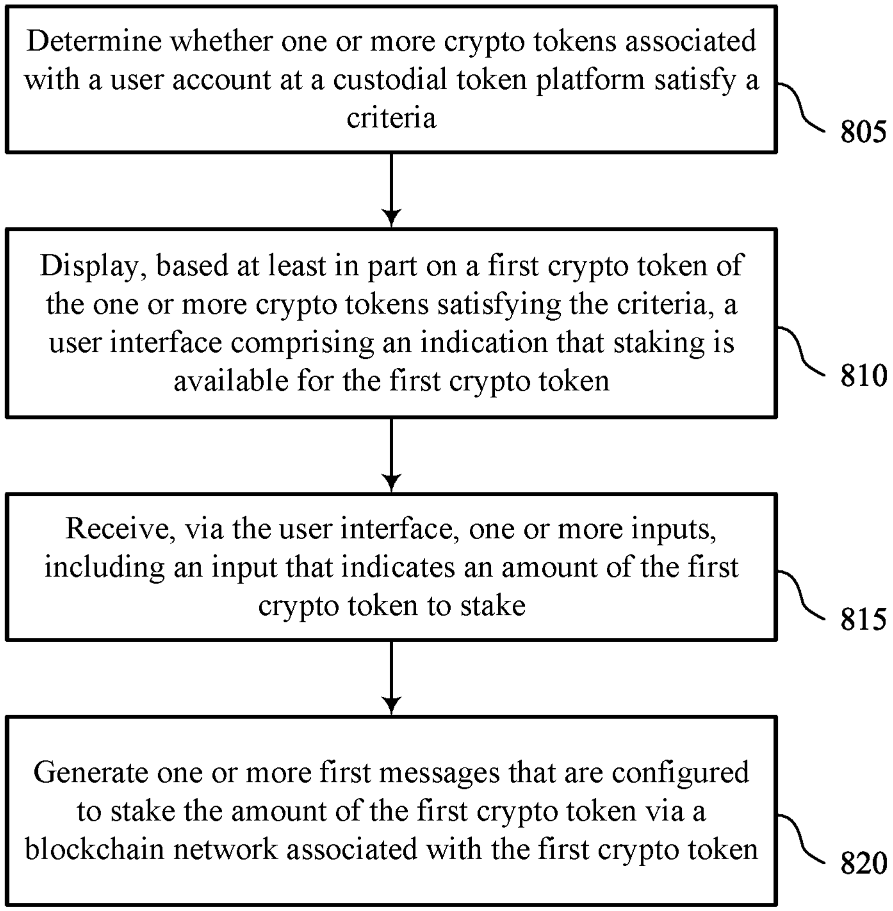
FIGS. 8 through 10 show flowcharts illustrating methods that support automatic staking of crypto tokens in accordance with aspects of the present disclosure.

FIG. 8 shows a flowchart illustrating a method 800 that supports automatic staking of crypto tokens in accordance with aspects of the present disclosure. The operations of the method 800 may be implemented by a custodial token platform or its components as described herein. For example, the operations of the method 800 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 805, the method may include determining whether one or more crypto tokens associated with a user account at a custodial token platform satisfy a criteria. The operations of block 805 may be performed in accordance with examples as disclosed herein. In some examples, aspects of the operations of 805 may be performed by a staking eligibility manager 625 as described with reference to FIG. 6.

At 810, the method may include displaying, based at least in part on a first crypto token of the one or more crypto tokens satisfying the criteria, a user interface comprising an indication that staking is available for the first crypto token. The operations of block 810 may be performed in accordance with examples as disclosed herein. In some examples, aspects of the operations of 810 may be performed by a staking indication manager 630 as described with reference to FIG. 6.

At 815, the method may include receiving, via the user interface, one or more inputs, including an input that indicates an amount of the first crypto token to stake. The operations of block 815 may be performed in accordance with examples as disclosed herein. In some examples, aspects of the operations of 815 may be performed by a staking input manager 635 as described with reference to FIG. 6.

At 820, the method may include generating one or more first messages that are configured to stake the amount of the first crypto token via a blockchain network associated with the first crypto token. The operations of block 820 may be performed in accordance with examples as disclosed herein. In some examples, aspects of the operations of 820 may be performed by a message manager 640 as described with reference to FIG. 6.

Figure 9:
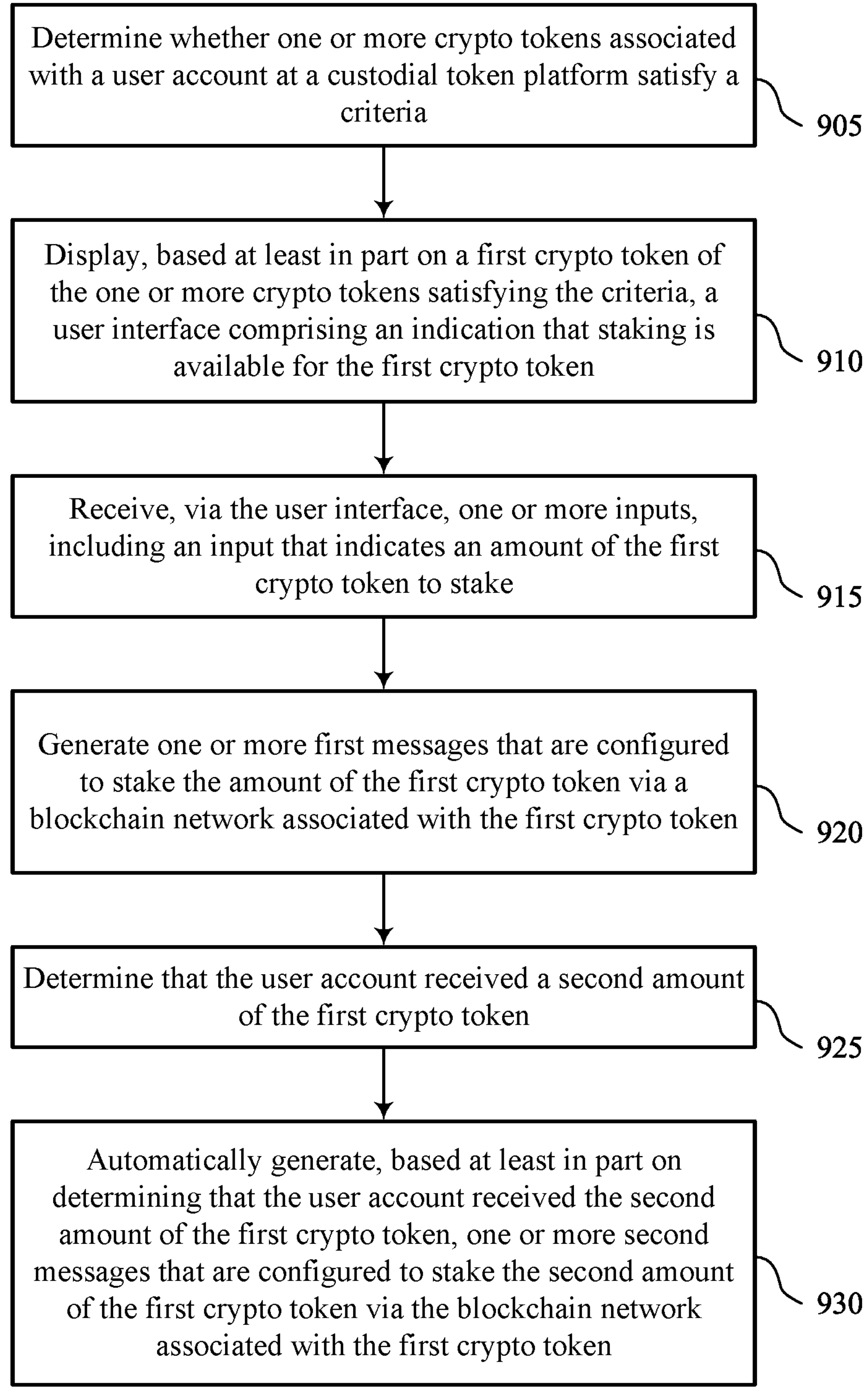

FIG. 9 shows a flowchart illustrating a method 900 that supports automatic staking of crypto tokens in accordance with aspects of the present disclosure. The operations of the method 900 may be implemented by a custodial token platform or its components as described herein. For example, the operations of the method 900 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 905, the method may include determining whether one or more crypto tokens associated with a user account at a custodial token platform satisfy a criteria. The operations of block 905 may be performed in accordance with examples as disclosed herein. In some examples, aspects of the operations of 905 may be performed by a staking eligibility manager 625 as described with reference to FIG. 6.

At 910, the method may include displaying, based at least in part on a first crypto token of the one or more crypto tokens satisfying the criteria, a user interface comprising an indication that staking is available for the first crypto token. The operations of block 910 may be performed in accordance with examples as disclosed herein. In some examples, aspects of the operations of 910 may be performed by a staking indication manager 630 as described with reference to FIG. 6.

At 915, the method may include receiving, via the user interface, one or more inputs, including an input that indicates an amount of the first crypto token to stake. The operations of block 915 may be performed in accordance with examples as disclosed herein. In some examples, aspects of the operations of 915 may be performed by a staking input manager 635 as described with reference to FIG. 6.

At 920, the method may include generating one or more first messages that are configured to stake the amount of the first crypto token via a blockchain network associated with the first crypto token. The operations of block 920 may be performed in accordance with examples as disclosed herein. In some examples, aspects of the operations of 920 may be performed by a message manager 640 as described with reference to FIG. 6.

At 925, the method may include determining that the user account received a second amount of the first crypto token. The operations of block 925 may be performed in accordance with examples as disclosed herein. In some examples, aspects of the operations of 925 may be performed by a staking eligibility manager 625 as described with reference to FIG. 6.

At 930, the method may include automatically generating, based at least in part on determining that the user account received the second amount of the first crypto token, one or more second messages that are configured to stake the second amount of the first crypto token via the blockchain network associated with the first crypto token. The operations of block 930 may be performed in accordance with examples as disclosed herein. In some examples, aspects of the operations of 930 may be performed by a message manager 640 as described with reference to FIG. 6.

Figure 10:
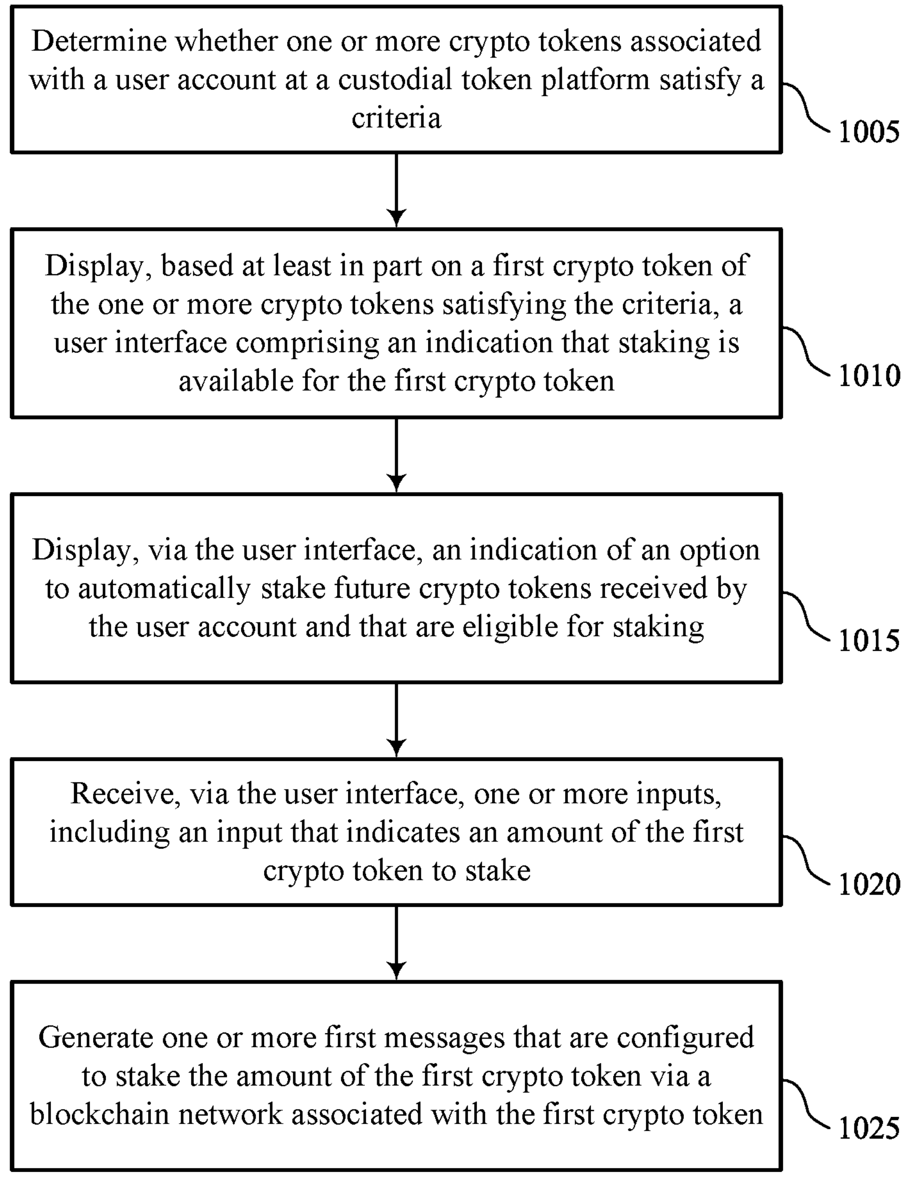

FIG. 10 shows a flowchart illustrating a method 1000 that supports automatic staking of crypto tokens in accordance with aspects of the present disclosure. The operations of the method 1000 may be implemented by a custodial token platform or its components as described herein. For example, the operations of the method 1000 may be performed by a custodial token platform as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1005, the method may include determining whether one or more crypto tokens associated with a user account at a custodial token platform satisfy a criteria. The operations of block 1005 may be performed in accordance with examples as disclosed herein. In some examples, aspects of the operations of 1005 may be performed by a staking eligibility manager 625 as described with reference to FIG. 6.

At 1010, the method may include displaying, based at least in part on a first crypto token of the one or more crypto tokens satisfying the criteria, a user interface comprising an indication that staking is available for the first crypto token. The operations of block 1010 may be performed in accordance with examples as disclosed herein. In some examples, aspects of the operations of 1010 may be performed by a staking indication manager 630 as described with reference to FIG. 6.

At 1015, the method may include displaying, via the user interface, an indication of an option to automatically stake future crypto tokens received by the user account and that are eligible for staking. The operations of block 1015 may be performed in accordance with examples as disclosed herein. In some examples, aspects of the operations of 1015 may be performed by an automatic staking manager 645 as described with reference to FIG. 6.

At 1020, the method may include receiving, via the user interface, one or more inputs, including an input that indicates an amount of the first crypto token to stake. The operations of block 1020 may be performed in accordance with examples as disclosed herein. In some examples, aspects of the operations of 1020 may be performed by a staking input manager 635 as described with reference to FIG. 6.

At 1025, the method may include generating one or more first messages that are configured to stake the amount of the first crypto token via a blockchain network associated with the first crypto token. The operations of block 1025 may be performed in accordance with examples as disclosed herein. In some examples, aspects of the operations of 1025 may be performed by a message manager 640 as described with reference to FIG. 6.

A method for token management is described. The method may include determining whether one or more crypto tokens associated with a user account at a custodial token platform satisfy a criteria, displaying, based at least in part on a first crypto token of the one or more crypto tokens satisfying the criteria, a user interface comprising an indication that staking is available for the first crypto token, receiving, via the user interface, one or more inputs, including an input that indicates an amount of the first crypto token to stake, and generating one or more first messages that are configured to stake the amount of the first crypto token via a blockchain network associated with the first crypto token.

An apparatus for token management is described. The apparatus may include at least one processor, at least one memory coupled with the at least one processor, and instructions stored in the at least one memory. The instructions may be executable by the at least one processor to cause the apparatus to determine whether one or more crypto tokens associated with a user account at a custodial token platform satisfy a criteria, display, based at least in part on a first crypto token of the one or more crypto tokens satisfying the criteria, a user interface comprising an indication that staking is available for the first crypto token, receive, via the user interface, one or more inputs, including an input that indicates an amount of the first crypto token to stake, and generate one or more first messages that are configured to stake the amount of the first crypto token via a blockchain network associated with the first crypto token.

Another apparatus for token management is described. The apparatus may include means for determining whether one or more crypto tokens associated with a user account at a custodial token platform satisfy a criteria, means for displaying, based at least in part on a first crypto token of the one or more crypto tokens satisfying the criteria, a user interface comprising an indication that staking is available for the first crypto token, means for receiving, via the user interface, one or more inputs, including an input that indicates an amount of the first crypto token to stake, and means for generating one or more first messages that are configured to stake the amount of the first crypto token via a blockchain network associated with the first crypto token.

A non-transitory computer-readable medium storing code for token management is described. The code may include instructions executable by a processor to determine whether one or more crypto tokens associated with a user account at a custodial token platform satisfy a criteria, display, based at least in part on a first crypto token of the one or more crypto tokens satisfying the criteria, a user interface comprising an indication that staking is available for the first crypto token, receive, via the user interface, one or more inputs, including an input that indicates an amount of the first crypto token to stake, and generate one or more first messages that are configured to stake the amount of the first crypto token via a blockchain network associated with the first crypto token.

Some examples of the method, apparatuses, and non-transitory computer-readable medium described herein may further include operations, features, means, or instructions for determining that the user account received a second amount of the first crypto token and automatically generating, based at least in part on determining that the user account received the second amount of the first crypto token, one or more second messages that may be configured to stake the second amount of the first crypto token via the blockchain network associated with the first crypto token.

In some examples of the method, apparatuses, and non-transitory computer-readable medium described herein, the user account received the second amount via the custodial token platform or via an inbound transfer from another address.

Some examples of the method, apparatuses, and non-transitory computer-readable medium described herein may further include operations, features, means, or instructions for displaying, via the user interface, an indication of an option to automatically stake future crypto tokens received by the user account and that may be eligible for staking.

In some examples of the method, apparatuses, and non-transitory computer-readable medium described herein, the criteria may be a threshold percentage of a crypto token associated with the user account that may be eligible for staking.

In some examples of the method, apparatuses, and non-transitory computer-readable medium described herein, receiving the one or more inputs may include operations, features, means, or instructions for receiving a selection of the first crypto token of a plurality of crypto tokens that may be eligible for taking.

In some examples of the method, apparatuses, and non-transitory computer-readable medium described herein, receiving the one or more inputs may include operations, features, means, or instructions for receiving an indication of the amount of the first crypto token to stake via the blockchain network, wherein the amount may be a percentage of the first crypto token relative to a total amount of the first crypto token associated with the user account, a quantity of the first crypto token, or a dollar amount of the first crypto token.

Some examples of the method, apparatuses, and non-transitory computer-readable medium described herein may further include operations, features, means, or instructions for determining, based at least in part on a first crypto token of the one or more crypto tokens satisfying the criteria, a return amount of at least the first crypto token that the user account would may have received via staking the first crypto token for a prior time period and displaying, via the user interface, an indication of the return amount.

Some examples of the method, apparatuses, and non-transitory computer-readable medium described herein may further include operations, features, means, or instructions for determining that the user account intends to acquire a second crypto token via the custodial token platform and displaying, via the user interface and after determining that the user account intends to acquire the second crypto token, an option to opt out of staking the second crypto token.

In some examples of the method, apparatuses, and non-transitory computer-readable medium described herein, the option may be displayed based at least in part on receiving the one or more inputs.

Some examples of the method, apparatuses, and non-transitory computer-readable medium described herein may further include operations, features, means, or instructions for transmitting an application programming interface (API) request that may be configured to cause the one or more first messages to be broadcast via the blockchain network.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for token management, comprising:

determining, at a custodial token platform, whether a plurality of crypto tokens associated with a user account at the custodial token platform satisfy a criteria, the criteria comprising a threshold percentage of a crypto token associated with the user account that is eligible for staking;

displaying, by the custodial token platform via a user interface and based at least in part on a set of crypto tokens of the plurality of crypto tokens satisfying the criteria, an indication that staking available for the set of crypto tokens;

receiving, via the user interface, a plurality of inputs, including a first input that indicates an amount of a first crypto token of the set of crypto tokens to stake and a second input that indicates a second amount of a second crypto token of the set of crypto tokens to stake;

transmitting, by the custodial token platform via a staking service associated with the custodial token platform and supporting a proof-of-stake consensus mechanism that secures one or more blockchain networks, a first message that stakes, as part of the proof-of-stake consensus mechanism, the amount of the first crypto token and the amount of the second crypto token via the one or more blockchain network associated with the first crypto token and the second crypto token, wherein the staking service maintains a validation node for the proof-of-stake consensus mechanism and wherein transmission of the first message is based at least in part on the staking service maintaining the validation node;

receiving, by the custodial token platform, an indication that the user account received additional funds including a third amount of the first crypto token; and transmitting, via the staking service and based at least in part on receiving the indication that the user account received the additional funds and without receiving additional user input via the user interface associated with receiving the additional funds, one or more second messages that stake, as part of the proof-of-stake consensus mechanism, the third amount of the first crypto token via the one or more blockchain networks associated with the first crypto token, wherein transmission of the one or more second messages is based at least in part on the staking service maintaining the validation node.

2. The method of claim 1, further comprising:

automatically generating, based at least in part on receiving the indication, the one or more second messages that stake the third amount of the first crypto token via the one or more blockchain networks associated with the first crypto token.

3. The method of claim 2, wherein the user account received the third amount of the first crypto token via the custodial token platform or via an inbound transfer from another address.

4. The method of claim 1, further comprising:

displaying, via the user interface, an indication of an option to automatically stake future crypto tokens received by the user account and that are eligible for staking, wherein transmitting the one or more second messages is based at least in part on displaying the indication.

5. The method of claim 1, wherein receiving the plurality of inputs comprises:

receiving a selection of the first crypto token of a second plurality of crypto tokens that are eligible for staking.

6. The method of claim 1, wherein receiving the plurality of inputs comprises:

receiving an indication of the amount of the first crypto token to stake via the one or more blockchain networks, wherein the amount is a percentage of the first crypto token relative to a total amount of the first crypto token associated with the user account, a quantity of the first crypto token, or a dollar amount of the first crypto token.

7. The method of claim 1, further comprising:

determining, based at least in part on the first crypto token of the plurality of crypto tokens satisfying the criteria, a return amount of at least the first crypto token that the user account would have received via staking the first crypto token for a prior time period; and displaying, via the user interface, an indication of the return amount.

8. The method of claim 1, further comprising:

determining that the user account intends to acquire a third crypto token via the custodial token platform; and displaying, via the user interface and after determining that the user account intends to acquire the third crypto token, an option to opt out of staking the third crypto token.

9. The method of claim 8, wherein the option is displayed based at least in part on receiving the plurality of inputs.

10. The method of claim 1, further comprising:

transmitting an application programming interface (API) request that is configured to cause the first message to be broadcast via the one or more blockchain networks.

11. An apparatus of a custodial token platform for token management, comprising:

one or more memories storing processor-executable code; and one or more processors coupled with the one or more memories and individually or collectively operable to execute the code to cause the apparatus to:

determine, at the custodial token platform, whether a plurality of crypto tokens associated with a user account at the custodial token platform satisfy a criteria, the criteria comprising a threshold percentage of a crypto token associated with the user account that is eligible for staking;

display, by the custodial token platform via a user interface and based at least in part on a set of crypto token of the plurality of crypto tokens satisfying the criteria, an indication that staking is available for the set crypto tokens;

receive, via the user interface, a plurality of inputs, including a first input that indicates an amount of a first crypto token of the set of crypto tokens to stake and a second input that indicates a second amount of a second crypto token of the set of crypto tokens to stake;

transmit, by the custodial token platform via a staking service associated with the custodial token platform and supporting a proof-of-stake consensus mechanism that secures one or more blockchain networks, a first message that stakes, as part of the proof-of-stake consensus mechanism, the amount of the first crypto token and the amount of the second crypto token via the one or more blockchain networks associated with the first crypto token and the second crypto token, wherein the staking service maintains a validation node for the proof-of-stake consensus mechanism and wherein transmission of the first message is based at least in part on the staking service maintaining the validation node;

receive, by the custodial token platform, an indication that the user account received additional funds including a third amount of the first crypto token; and transmit, via the staking service and based at least in part on receiving the indication that the user account received the additional funds and without receiving additional user input via the user interface associated with receiving the additional funds, one or more second messages that stake, as part of the proof-of-stake consensus mechanism, the third amount of the first crypto token via the one or more blockchain networks associated with the first crypto token, wherein transmission of the one or more second messages is based at least in part on the staking service maintaining the validation node.

12. The apparatus of claim 11, wherein the one or more processors are individually or collectively further operable to execute the code to cause the apparatus to:

automatically generate, based at least in part on receiving the indication, the one or more second messages that stake the third amount of the first crypto token via the one or more blockchain networks associated with the first crypto token.

13. The apparatus of claim 12, wherein the user account received the third amount of the first crypto token via the custodial token platform or via an inbound transfer from another address.

14. The apparatus of claim 11, wherein the one or more processors are individually or collectively further operable to execute the code to cause the apparatus to:

display, via the user interface, an indication of an option to automatically stake future crypto tokens received by the user account and that are eligible for staking, wherein transmitting the one or more second messages is based at least in part on displaying the indication.

15. The apparatus of claim 11, wherein, to receive the plurality of inputs, the one or more processors are individually or collectively operable to execute the code to cause the apparatus to:

receive a selection of the first crypto token of a second plurality of crypto tokens that are eligible for staking.

16. The apparatus of claim 11, wherein, to receive the plurality of inputs, the one or more processors are individually or collectively operable to execute the code to cause the apparatus to:

receive an indication of the amount of the first crypto token to stake via the one or more blockchain networks, wherein the amount is a percentage of the first crypto token relative to a total amount of the first crypto token associated with the user account, a quantity of the first crypto token, or a dollar amount of the first crypto token.

17. A non-transitory computer-readable medium storing code for token management, the code comprising instructions executable by one or more processors of a custodial token platform to:

determine, at the custodial token platform, whether a plurality of crypto tokens associated with a user account at the custodial token platform satisfy a criteria, the criteria comprising a threshold percentage of a crypto token associated with the user account that is eligible for staking;

display, by the custodial token platform via a user interface and based at least in part on a set of crypto token of the plurality of crypto tokens satisfying the criteria, an indication that staking is available for the set of crypto tokens;

receive, via the user interface, a plurality of inputs, including a first input that indicates an amount of a first crypto token of the set of crypto tokens to stake and a second input that indicates a second amount of a second crypto token of the set of crypto tokens to stake;

transmit, by the custodial token platform via a staking service associated with the custodial token platform and supporting a proof-of-stake consensus mechanism that secures one or more blockchain networks, a first message that stakes, as part of the proof-of-stake consensus mechanism, the amount of the first crypto token and the amount of the second crypto token via the one or more blockchain networks associated with the first crypto token and the second crypto token, wherein the staking service maintains a validation node for the proof-of-stake consensus mechanism and wherein transmission of the first message is based at least in part on the staking service maintaining the validation node;

receive, by the custodial token platform, an indication that the user account received additional funds including a third amount of the first crypto token; and transmit, via the staking service and based at least in part on receiving the indication that the user account received the additional funds and without receiving additional user input via the user interface associated with receiving the additional funds, one or more second messages that stake, as part of the proof-of-stake consensus mechanism, the third amount of the first crypto token via the one or more blockchain networks associated with the first crypto token, wherein transmission of the one or more second messages is based at least in part on the staking service maintaining the validation node.

18. The non-transitory computer-readable medium of claim 17, wherein the instructions are further executable by the one or more processors to:

automatically generate, based at least in part on receiving the indication, the one or more second messages that stake the third amount of the first crypto token via the one or more blockchain networks associated with the first crypto token.

* * * * *